United States Patent [19]

Wentzell et al.

[11] Patent Number: 4,575,185

[45] Date of Patent: Mar. 11, 1986

[54] SYSTEM FOR A FIBER OPTIC CABLE FOR REMOTE INSPECTION OF INTERNAL STRUCTURE OF A NUCLEAR STEAM GENERATOR

[75] Inventors: Timothy H. Wentzell, South Windsor; John P. Lareau; Charles B. Innes, Jr., both of Granby, all of Conn.

[73] Assignee: Combustion Engineering, Inc., Windsor, Conn.

[21] Appl. No.: 519,152

[22] Filed: Aug. 1, 1983

[51] Int. Cl.⁴ .............................................. G02B 5/17
[52] U.S. Cl. .............................. 350/96.26; 405/171; 138/121; 128/6; 350/96.25
[58] Field of Search ............... 350/96.23, 96.24, 96.25, 350/96.26; 128/6; 138/103, 121; 405/171, 157

[56] References Cited

U.S. PATENT DOCUMENTS 3,756,034  9/1973  Lochridge et al. ................. 405/171

Primary Examiner—John Lee
Assistant Examiner—Lester Rushin
Attorney, Agent, or Firm—Arthur L. Wade

[57] ABSTRACT

The sealed shell of a nuclear steam generator is penetrated through a fluid lock by an elongated assembly including an axial fiber optic cable. Fluid pressure chambers within the assembly are selectively pressured to control the movement of the fiber optic head in visual inspection within the shell. Liquid is selectively introduced into the chambers to control buoyancy of the assembly.

10 Claims, 5 Drawing Figures

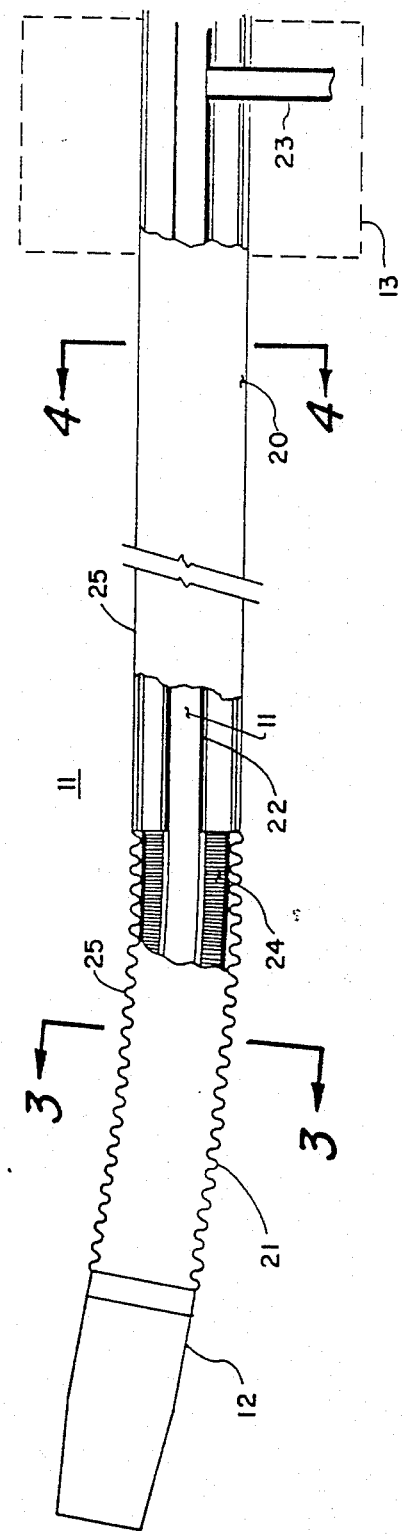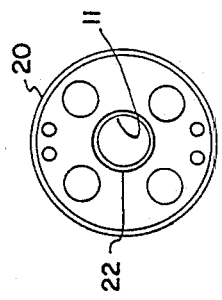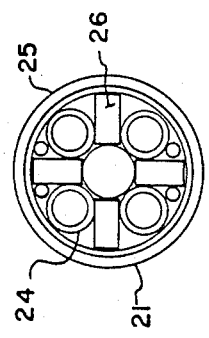

SYSTEM FOR A FIBER OPTIC CABLE FOR REMOTE INSPECTION OF INTERNAL STRUCTURE OF A NUCLEAR STEAM GENERATOR

TECHNICAL FIELD

The present invention relates to a system for direct, visual observation of the internal structure of a sealed nuclear steam generator. More particularly, the invention relates to a system for manipulating a fiber optic cable inserted into a nuclear steam generator without draining fluid, and the controlled flexure and position of the system.

BACKGROUND ART

A typical nuclear steam generator comprises a vertically oriented shell, a plurality of U-shaped tubes disposed in the shell so as to form a tube bundle, a tube sheet for supporting the tubes at the ends opposite their U-like curvature, a dividing plate which is arranged with the tube sheet to form a primary fluid inlet plenum at one end of the tube bundle and a primary fluid outlet plenum at the other end of the tube bundle, a primary fluid inlet nozzle in fluid communication with the primary fluid inlet plenum and a primary fluid outlet nozzle in fluid communication with the primary fluid outlet plenum. The steam generator also comprises a space disposed between the tube bundle and the shell to form an annular chamber with the internal wall of the shell, and a feedwater ring disposed above the U-line curvature end of the tube bundle. The primary fluid having been heated by circulation through the reactor core, enters the steam generator through the primary fluid inlet nozzle. From the primary fluid inlet nozzle, the primary fluid flows through the primary fluid inlet plenum, through the tubes of the bundle, out the primary fluid outlet plenum, through the primary fluid outlet nozzle to the remainder of the reactor coolant system. At the same time, feedwater is introduced to the steam generator through the feedwater ring. The feedwater is directed down the annular chamber adjacent to the shell until the tube sheet near the bottom of the annular chamber causes the feedwater to reverse direction, passing in heat transfer relationship with the outside of the U-shaped tubes of the bundle and up through the tube bundle. While the feedwater is circulating in heat transfer relationship with the tubes of the bundle, heat is transferred from the primary fluid in the tubes to the feedwater over the outside of the tubes, causing some predetermined portion of the feedwater to be converted to steam. The steam then rises and is circulated through typical electrical generating equipment producing electricity in a manner well-known in the art.

Since the primary fluid contains radioactive particles and is isolated from the feedwater only by the walls of the U-shaped tubes which may be constructed from Inconel, the U-tube walls form part of the primary boundary for isolating these radioactive particles. It is, therefore, important that the U-tubes be maintained defect-free so that no ruptures will occur in the U-tubes. However, experience has shown that under certain conditions the U-tubes may develop leaks therein which allow radioactive particles to contaminate the feedwater, a highly undesirable accident.

Regardless of the specific reason for tube degradation in the area above the tube sheet, there is a need for direct visual, periodic inspection of all areas of the tubes and other internal structures of the steam generator as defects develop. An excellent tool is now available employing the techniques of fiber optics. The elongated fiber optic cable is available for insertion into the steam generator. There is need for a seal between the generator shell and the fiber optic cable, and a system for controlling buoyancy of the cable and directional flexure to obtain plenary visual inspection of the tubes and other internal structures of the shell.

DISCLOSURE OF THE INVENTION

The present invention contemplates a plurality of extendible members powered by fluid pressure and connected to the leading or sighting end of a fiber optic cable to flex the length of the cable end and thereby control position and the direction of sight.

The invention further contemplates inserting fluids of different densities in the extendible members to control the buoyancy of the sighting end of the cable.

The invention further contemplates an expandable chamber formed the length of the major portion of the cable and a source of liquid for the chamber to determine the degree of buoyancy for the major length of the cable.

The invention further contemplates the fiber optic cable, the plurality of extendible members, expandable chamber, and an external sheath inserted through the wall of a sealed enclosure through a system of seals arranged to maintain the integrity of the wall seal.

The invention further contemplates a plurality of guide tubes mounted to provide a selection of initial direction for the system.

Other objects, advantages and features of this invention will become apparent to one skilled in the art upon consideration of the written specification, appended claims, and attached drawings.

BRIEF DESIGNATION OF THE DRAWINGS

FIG. 2 is a sectioned elevation of the system of FIG. 1 with the plurality of extendible members mounted on the flexed end and the expandable chamber extending the major length;

FIG. 3 is a section of FIG. 2 along lines 3—3;

FIG. 4 is a section along lines 4—4 of FIG. 2; and

BEST MODE FOR CARRYING OUT THE INVENTION

Terms and Technology

Figure 1:
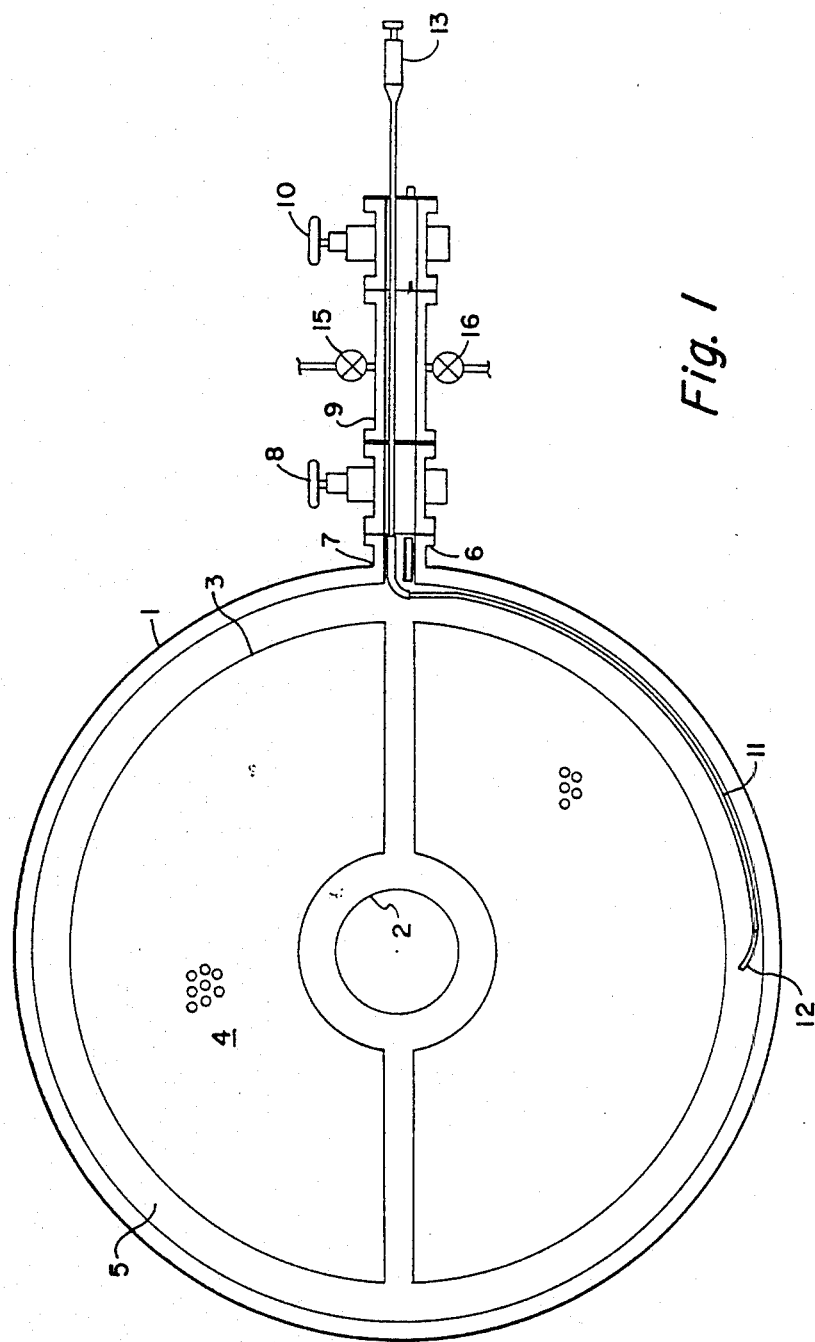
FIG. 1 is a sectioned plan view of a nuclear steam generator on the wall of which is mounted a valve and seal system through which is extended the system in which the present invention is embodied.

The invention is disclosed as related to a fiber optic cable having a length in the order of 20 feet, and a diameter in the order of ¼". The disclosure of the invention does not include the fiber optic cable associated with the system. The inspection or leading end of the cable terminates in a head which is the eye of the cable. This head includes lenses, reflectors, and light sources, as well as structure for directing the "sight" of the cable end and selected radial deviations from the axis of the cable. As important and sophisticated as the arrangement of the head structure may be, the present invention is not embodied therein. Similarly, the receiving station at the rear end of the fiber optic cable does not embody the present invention. The ultimate function of the system embodying the present invention is to place the head at predetermined locations within the Stygian depths of the liquid-filled secondary side of a nuclear steam generator.

The major length of the system is to be compared to the arm of an operator thrust into an environment to be inspected. It is structure embodying the present invention that directs this major portion of the cable at its inspection end analogous to the wrist action of a human arm.

In addition to controlled flexing of the cable in its major and minor lengths, the buoyancy of each length is separately controlled by the introduction of fluids of different density. To attain plenary positioning of the cable eye, the buoyancy of each cable length and their flexure must be subject to the control of an operator stationed outside the sealed housing of a nuclear steam generator. Both the pressure of gaseous fluids and the density of liquid fluids are used to generate the forces applied to adjust the buoyancy of the cable and its flexure.

To control the buoyancy of the major length of the cable, it is encapsulated within a tube fitting as a sheath over the cable. The result is an expandable chamber between the internal surface of the tube and the external surface of the cable. Liquid introduced into this chamber controls the overall buoyancy of their combination. Both the buoyancy and the flexure of the leading end length of the cable are controlled by attaching elongated chambers along the outside surface of the inspection end of the cable. The elongatable or convoluted chambers respond to the increase in the internal fluid pressure by lengthening. With each end of each elongated chamber connected to the end of the leading length of the cable, the lengthening of a selected one of the chambers will force the cable to axially flex in a predetermined direction. To provide for universal direction of flexure, a cluster of elongated chambers are mounted about the inspection end of the cable and selectively lengthened by fluid pressure.

Communication of fluids, both gas and liquid, with the cluster of elongated chambers is provided by conduits extending back along the outside of the sheath encapsulating the major length of the cable. Finally, an external sheath is provided over all the complete bundle of chambers, tubes, and conduits clustered about the central fiber optic cable. Additionally, the necessary communication between the inspection head of the cable and the remote external location is provided with the wires and tubes necessary which extend the length of the cable as a part of the matrix or bundle enclosed within the external sheath.

Having generally described the organization of the bundle of tubes, conduits, and chambers clustered the length of the fiber optic cable, the insertion and withdrawal of this one-eyed snake into and from the steam generator is considered. Entry through the shell of the generator is provided through the available handhole above the level of the tubesheet for the tubes of the secondary side of the generator. A flange is fabricated over the handhole and a pair of gate or ball valves are aligned on the flange. With both valves open, a passage is provided through the valves and the handhole through which the system is thrust into the interior of the generator. An effective fluid lock is provided with which to prevent the uncontrolled leakage of secondary fluid from the generator. Once thrust through this lock and deflected initially by a guide at the handhole, the end of the cable may be flexed to position the detecting head as required for inspection of the internal structure of the generator.

Entry and Withdrawal Of The Cable Assembly

In FIG. 1, the plan view of the steam generator discloses shell 1 whose internal structure is to be visually inspected by a fiber optic cable. The familiar stay cylinder 2, tube bundle 3, and tubesheet 4 are revealed in conventional relationship to each other. It is assumed the shell is inspected while filled with body of feedwater 5 of the secondary side. It is desirable that this inspection be carried out through a lock with which the integrity of the shell enclosure is maintained.

A flange 6 is fabricated on handhole 7 and forms a mount for inboard gate valve 8. A cylindrical chamber 9 extends between valve 8 and outboard gate valve 10. These valves, together with appropriate seal glands, form a liquid lock through which the inspecting system is extended.

Fiber optic cable 11 is made up into an assembly extending from inspecting head 12 on the leading end of the cable and receiving station 13 on the rear end of the cable. This assembly about the fiber optic cable includes the structure of the system with which the cable is flexed and its buoyancy controlled in the body of feedwater within shell 1. The assembly, including fiber optic cable 11, may be designated subsequently as 11, interchangeably with the fiber optic cable.

One purpose of the disclosure of FIG. 1 is to advance understanding that cable assembly 11 is to be guided through valves 8 and 10, associated seals, and chamber 9 in order to be thrust into the interior of shell 1. A plurality of guide structures for the cable are associated with valves 8 and 10, and chamber 9.

Details of the seal glands associated with the entry system and seal plates will be disclosed in a subsequent figure. FIG. 1 teaches that chamber 9 is first purged with air through a valve 15 controlling a supply of high pressure air, and drained through a valve 16 into a suitable receptacle. Both valves 15 and 16 are then closed and outboard valve 10 is opened. The guide structure selected for assembly 11 has a seal gland. Also, the guide not selected will be plugged. Assembly 11 is then slipped down through its guide, past gate valve 10, and into chamber 9. Prior to opening inboard valve 8, chamber 9 is pressured through valve 15, bringing the pressure of the chamber up to approximately that within shell 1. Inboard valve 8 is then opened and assembly 11 continues to be guided into the interior of shell 1. Once inside shell 1, assembly 11 is buoyed, deflected, and flexed by the structure embodying the invention to execute the direct visual inspection.

After the visual inspection has been completed, the head of the sighting end of the assembly 11 is withdrawn into chamber 9. Inboard valve 8 is closed and chamber 9 is drained through valve 16 and purged as required by compressed air controlled through valve 15. After the purging and draining of chamber 9 is completed, valves 15 and 16 may be closed and assembly 11 completely withdrawn. Following the complete withdrawal of assembly 11 and its storage, valve 10 may be shut as further assurance against a breach of the integrity of the seal of shell 1. Further assurance may be provided by removing chamber 9 and outboard valve 10 and replaced by a sturdy blind flange bolted over what is now the exit of inboard valve 8.

The Structure of Assembly 11

FIGS. 2, 3 and 4 are to be taken together as disclosure of the structure of assembly 11. First, the reduction to practice of the assembly 11 had a length in the order of 30 feet and a diameter in the order of 2 inches. This elongated structure was extended through the passage provided by aligned gate valves 8 and 10 and chamber 9 forming a circular passage having a diameter in the order of 8 inches. These dimensions, however, are not limiting in any way relative to the invention. The fiber optic cable is the core of this assembly and is connected to head 12 at its inspecting end and receiving station 13 at its rear end. This head and station are merely externally indicated in black-box convention, their inner workings and cooperation through the fiber optic cable has an extremely important function but ancillary to the structure in which the present invention is embodied. In disclosure and analysis of assembly 11, the disclosure begins with the fiber optic cable as the core. Next, the lengths of two portions of cable assembly 11 are contemplated. The major length of the assembly is designated 20 while the approximately 2-foot leading length is designated 21. The major length 20 has the flexibility for a high degree of deflextion by an external guide structure. The leading length 21 is flexed in any direction by internal structure to provide plenary positioning of head 12 within the body of feedwater. Extendible and expandable chambers are provided within the assembly to flex the inspecting end portion 21, control its buoyancy, and control the buoyancy of the major length 20.

An expandable chamber is provided the length of the major portion 20 by encapsulating the fiber optic cable with an elastic sheath 22. Sealing the forward end of the sheath to the outer surface of the cable and providing a connection with a conduit 23 at its rear end, provides the means with which fluid is introduced between the sheath and cable. It is important that a uniform layer of liquid be provided along the major length 20 and longitudinal striations can be provided in the sheath to promote the formation of this fluid in a uniform layer. Control of the introduction and withdrawal of fluid from this chamber between sheath and cable is represented by conduit 23. Details of a disclosed supply of fluid and the controls introducing the fluid into the chamber through conduit 23 is not required to teach this feature of the invention. The concept is fully disclosed as including the introduction of a fluid of selected density which will control the buoyancy of assembly 11 as it is extended into the body of feedwater within shell 1. Sheath 22 is expected to have the elasticity to expand as fluid is introduced into the chamber the sheath forms with the fiber optic cable, and to expel this same fluid through conduit 23 in the process of altering the buoyancy. In other words, the fluid is introduced into and withdrawn from the expandable chamber through the single conduit 23.

Attention shifts to the 2-foot long leading end section 21 of the assembly. The assembly has a cluster of extendible chambers 24, which chambers are arranged parallel to each other and to the fiber optic cable around which they are clustered. Each of these extendible chambers 24 is connected between the ends of section 21. Restrained from buckling outward when their internal pressure is increased, these extendible chambers will bow the 2-foot section 21 in a direction away from the particular chamber which is provided a greater internal pressure than its companion chambers.

The extendible chambers 24 each resemble a convoluted hose of the well-known vacuum sweeper. With this configuration, the chambers are both extendible and flexible. The chambers are restrained from lateral bowing by an external sheath 25 and partitions 26 between the chambers. External sheath 25 along the length of portion 21 is provided circumferen convolutions which give flexibility to the entire portion. Sheath 25 is extended back over the major portion 20 of the assembly to provide mechanical protection for all the conduits or tubes supplying the fluids necessary to increase the pressure within chamber 24 and liquid which may be introduced to determine the buoyancy of portion 21.

The cross-sectional views of FIGS. 3 and 4 are each provided for additional clarity of the arrangement of the extendible chambers 24 and the expandable chamber of sheath 22. It is deemed unnecessary to go into the detail of pointing out specifically the fluid lines to extendible chambers 24. It is contemplated that possibly two lines for bearing fluids to each of the chambers 24 will be required, one line to supply fluids and the other line to drain the fluids. It is quite possible that extendible chambers 24 will not have the elasticity to force the fluids from the chambers, such as anticipated by the function of sheath 22. Finally, it is to be noted that the external sheath 25 over the major portion 20 is to present a smooth external surface in order to function effectively in sealing to the O-rings or glands provided in the guide structure which will now be disclosed in FIG. 5.

Figure 5:
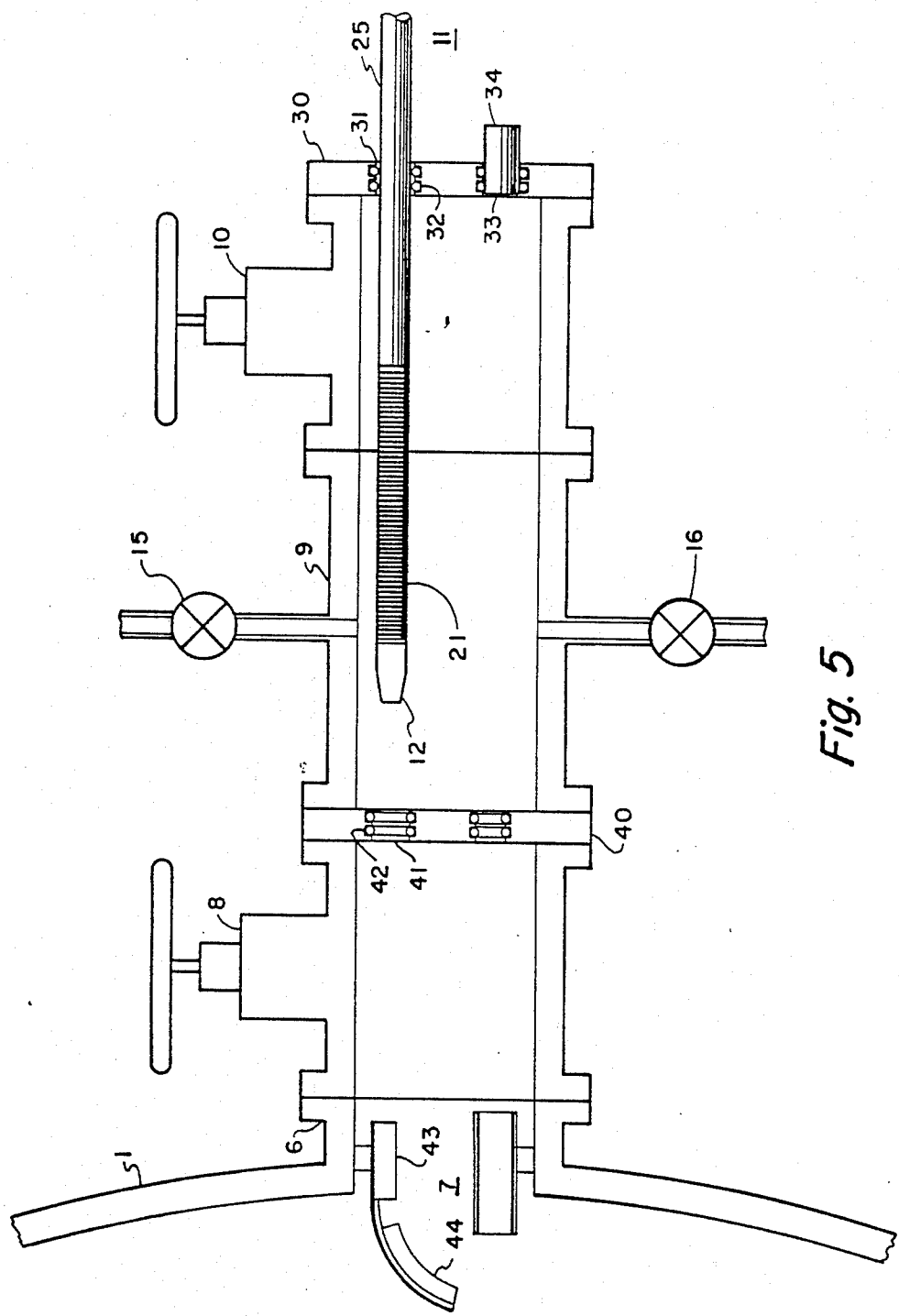
FIG. 5 is an enlarged sectioned elevation of the entry system of FIG. 1.

FIG. 5 is established, primarily as an enlargement of the two valves 8 and 10 with their connecting chamber 9. In FIG. 1, the cable assembly 11 is depicted as extended through the valves and chamber and deflected to one side of the tube bundle 3. In FIG. 5, cable assembly 11 is shown with its leading portion 21 thrust into chamber 9 between the valves.

At the entrance of outboard valve 10, a barrier, bulkhead, or seal plate is provided in the form of a disc having a typical thickness in the order of 2 inches and a diameter in the order of 8". This seal plate 30 is provided with guide structures in the form of holes whose diameters accommodate that of assembly 11. Each of these holes is provided with O-rings mounted in a gland formed in the wall. In FIG. 5, hole 31 has been selected and assembly 11 thrust therethrough. The external surface of sheath 25 is brought into sliding/sealing engagement with O-rings 32. All other guide structure holes in the seal plate are plugged. In illustration of this plugging, hole 33 is shown as having plug 34 mounted therein.

Outboard valve 10 has been opened, assembly 11 thrust through seal plate 30 and the seal with O-rings 32 perfected. This sliding seal is effective to prevent leakage from chamber 9. Chamber 9 is then pressured through valve 15 to at least the pressure beyond inboard valve 8. Valve 8 is then opened and assembly 11 is thrust through seal plate 40, through valve 8, and on into the interior of shell 1. Seal plate 40, for purposes of the present disclosure, is identical to seal plate 30. It is mounted as a barrier or bulkhead to the entrance of inboard valve 8, with its guide structure holes aligned with those of seal plate 30. Hole 41 is aligned with hole 31 and has O-rings 42 exactly as does hole 31. The other guide holes of this seal plate 40 are paired with aligned holes in seal plate 30.

Plug 34 can only be regarded as representative of the necessity for maintaining sealing integrity through seal plates 30 and 40 when assembly 11 has been extended through an aligned pair of guide holes through these seal plates. The difficulty is in the fact that some form of plug structure must be provided for the unused hole in plate 40 aligned with the unused hole in seal plate 30. Offhand, one might jump to the conclusion that a plug structure similar to plug 34 could be provided for the hole in plate 40. But how do you get such structure past seal plate 30? A tool for grasping this plug structure could be extended through a hole in seal plate 30 to manipulate the plug into position, but how does the plug get into chamber 9? A more practical way of plugging aligned holes of the seal plate through which assembly 11 is not extended is to provide a cylindrical body the same size as assembly 11 to be extended through the unused hole in seal plate 30 and through the aligned unused guide hole in seal plate 40. The seals between the cylindrical body and the walls of the unused openings is perfected just as the seals are perfected between the external surface of assembly 11 and the seals in the holes through which it extends.

In all events, some means must be provided to seal the unused holes in seal plates 30 and 40 when two of the aligned holes are utilized to guide assembly 11 into the steam generator. When assembly 11 is in place, actively exploring the internal structure of the generator, both valves 8 and 10 are open. During this period of inspection all the unused guide holes of both seal plates should be plugged in some way to ensure the integrity of the generator shell.

In FIG. 5, assembly 11 is in position, poised to thrust its leading portion 21 through seal plate 40 when valve 8 is opened. There remains in final guidance, a guide tube for each pair of aligned guide holes. Each pair of aligned holes in the seal plates are, in turn, aligned with a guide tube mounted on the handhole flange of shell 1. Aligned with holes 31 and 41, guide tube 43 is shown ready to receive the leading portion of assembly 11. The end 44 is shaped to deflect assembly 11 from following the axis of the tube and guide structure holes. The final position of assembly 11 is disclosed in FIG. 1.

Withdrawal of assembly 11 reverses the steps of insertion of leading portion 21. The leading portion 21 is withdrawn to the position shown in FIG. 5. Inboard valve 8 is closed and chamber 9 drained through valve 16 into a receptacle suitable for presumably contaminated generator water. Purging may also take place through valve 15. Once the purging and draining is completed, assembly 11 may be withdrawn through seal plate 30 and outboard valve 10 closed. Although the sealing capacity of both inboard and outboard gate valves 8 and 10 may prove adequate, the safety program may dictate removal of the outboard valve and chamber 9. A blind flange may then be sealed and bolted over the opening of inboard valve 8 until the next cycle of inspection is required.

Conclusion

The foregoing disclosure has laid perhaps excessive emphasis on the structure and procedure for insertion and withdrawal of cable assembly 11. It is important that assembly 11 be inserted into the high pressure within the steam generator through a seal system which will maintain the integrity of the generator seal; thus, the somewhat formidable arrangement of gate valves and purge chamber. Further, the seal plates are necessary to support the O-rings which maintain sliding, sealing engagement with the external surface of sheath 25. These important structures aside, it is vital that internal structure of the assembly for the fiber optic cable includes structure which can be remotely operated to steer the "eye" of head 12 into every nook and cranny of the generator's internal structure. The buoyancy-controlling chambers within assembly 11 and the "muscle" of the extendible chambers in leading portion 21 provide the omnidirectional movement of head 12 to carry out the basic mission of inspection.

From the foregoing, it will be seen that this invention is one well adapted to attain all of the ends and objects hereinabove set forth, together with other advantages which are obvious and inherent to the apparatus.

It will be understood that certain features and subcombinations are of utility and may be employed without reference to other features and subcombinations. This is contemplated by and is within the scope of the invention.

As many possible embodiments may be made of the invention without departing from the scope thereof, it is to be understood that all matter herein set forth or shown in the accompanying drawings is to be interpreted in an illustrative and not in a limiting sense.

We claim:

1. An assembly for inserting in liquid environments including a fiber optic cable having a major and minor length and controlled buoyancy and flexure, including,
    an expandable sheath (22) arranged about and extending the major length of the fiber optic cable to form an expandable chamber between the sheath and external surface of the cable,
    a source of liquid connected to the sheath-cable chamber regulated to flow a predetermined amount of liquid into the chamber to adjust the buoyancy of the assembly in the liquid environment,
    a plurality of flexible and elongated and longitudinally extendible chambers connected by each of their ends to the minor length of the cable,
    and sources of fluids connected to each chamber to selectively provide predetermined pressures to each chamber in flexing the minor length of the cable and regulating the buoyancy of the minor length.

2. The assembly of claim 1, wherein,
    the elongated chambers are each in the form of a convoluted cylinder and their supply of fluids is regulated from a station remote from the minor length of the cable.

3. The assembly of claim 2, including,
    a sheath (25) of material which gives both flexibility and mechanical protection arranged externally over the cable and extendible chambers and the conduits connecting the extendible chambers to their sources of fluid supply.

4. The assembly of claim 3, wherein,
    that portion of the external protective sheath (25) over the extendible chambers (24) is in the form of a circumferentially convoluted cylinder.

5. A system for deflecting and flexing and controlling the buoyancy of a fiber optic cable, including,
    a fiber optic cable having a head attached to its first end to transmit a visual image to a receiving station connected to the second end of the cable,
    means for initially deflecting the assembly as the assembly is moved to insert its attached head to the position for inspection, a cluster of extendible chambers (24) connected to each end of the first length of the cable extending back from the inspecting head, a source of fluid pressure connected to each extendible chamber of the cluster to create an internal pressure within the chamber to extend that chamber to control the direction of flexure of the first end of the cable, an expandable sheath (22) over and along the length of the cable to form a chamber of variable volume, and a source of liquid connected to the chamber of variable volume to insert a predetermined amount of liquid to control the buoyancy of the complete cable in a liquid environment.

6. The system of claim 5, in which, each extendible chamber of the cluster is convoluted to provide deviation from axial alignment in flexing the end of the cable to which it is attached.

7. A system for direct visual inspection of the internal structure of a nuclear steam generator while the generator is filled with a body of feedwater on the secondary side, including, an access opening formed through the shell of a nuclear steam generator, an inboard gate valve mounted on the access opening of the shell, a cylindrical chamber mounted on the inboard gate valve and in alignment with the access opening, an outboard gate valve mounted on the chamber in alignment with the chamber and inboard gate valve to form a passage with the access opening and valves and chamber, a first sliding seal on the internal wall of the passage between the inboard gate valve and chamber, a second sliding seal on the internal wall of the passage at the entrance to the outboard gate valve, a source of high pressure gas connected through a valve to the chamber, means for draining the chamber through a valve, a fiber optic cable assembly inserted through the seals in the passage, and means for controlling the buoyancy and axial deflection of the fiber optic cable assembly while the assembly is within the liquid-filled generator.

8. The system of claim 7, including, a plurality of seal plates within the passage having aligned guide holes supporting the sliding seals, and means for plugging the unused guide holes at the outboard gate valve while the fiber optic cable assembly is inserted through a selected one of the guide holes.

9. The system of claim 7, including, an external sheath for the fiber optic cable assembly which engages the sliding seals supported by the guide holes of the seal plates provided in the passage.

10. The system of claim 7, in which, the means controlling the buoyancy and direction of the assembly includes an expandable chamber extended a length of the assembly supplied a predetermined amount of liquid, and a cluster of extendible chambers connected to the leading portion of the assembly supplied predetermined amounts of fluid pressure to axially deflect the leading portion of the assembly.

* * * * *